United States Patent
Mori et al.

(10) Patent No.: US 7,237,798 B2
(45) Date of Patent: Jul. 3, 2007

(54) AIRBAG FOR REAR-END COLLISION AND AIRBAG APPARATUS FOR REAR-END COLLISION

(75) Inventors: Kenji Mori, Aichi-ken (JP); Hiroyuki Kobayashi, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 399 days.

(21) Appl. No.: 10/844,569

(22) Filed: May 13, 2004

(65) Prior Publication Data
US 2004/0239083 A1 Dec. 2, 2004

(30) Foreign Application Priority Data
May 14, 2003 (JP) ............................. 2003-136536
Sep. 26, 2003 (JP) ............................. 2003-336412

(51) Int. Cl.
*B60R 21/16* (2006.01)
*B60R 21/20* (2006.01)

(52) U.S. Cl. ................. 280/730.1; 280/742; 280/743.1

(58) Field of Classification Search ............ 280/730.1, 280/730.2, 742, 743.1, 736
See application file for complete search history.

(56) References Cited

U.S. PATENT DOCUMENTS 6,113,132 A * 9/2000 Saslecov ................. 280/730.1
6,471,240 B2 * 10/2002 Bakhsh et al. .............. 280/729
6,695,342 B2 * 2/2004 Tanase et al. ............ 280/730.2
6,811,184 B2 * 11/2004 Ikeda et al. .................. 280/742
6,945,556 B2 * 9/2005 Maertens ..................... 280/729

FOREIGN PATENT DOCUMENTS

JP   A-2002-362284   12/2002

* cited by examiner

Primary Examiner—Ruth Ilan
(74) Attorney, Agent, or Firm—Posz Law Group, PLC

(57) ABSTRACT

An airbag for rear-end collision of a vehicle is accommodated in the interior of the vehicle while being folded in a state extending along a lateral direction of the vehicle. When supplied with gas, the airbag is inflated and deployed in a part of the passenger compartment rearward of the rearmost seat. The airbag has a supply port and a distribute section. The supply port permits gas to be supplied to the interior of the airbag. The distribution section is connected to the supply port. The distribution section distributes gas that has passed through the supply port end sections of the airbag in the lateral direction of the vehicle.

20 Claims, 9 Drawing Sheets

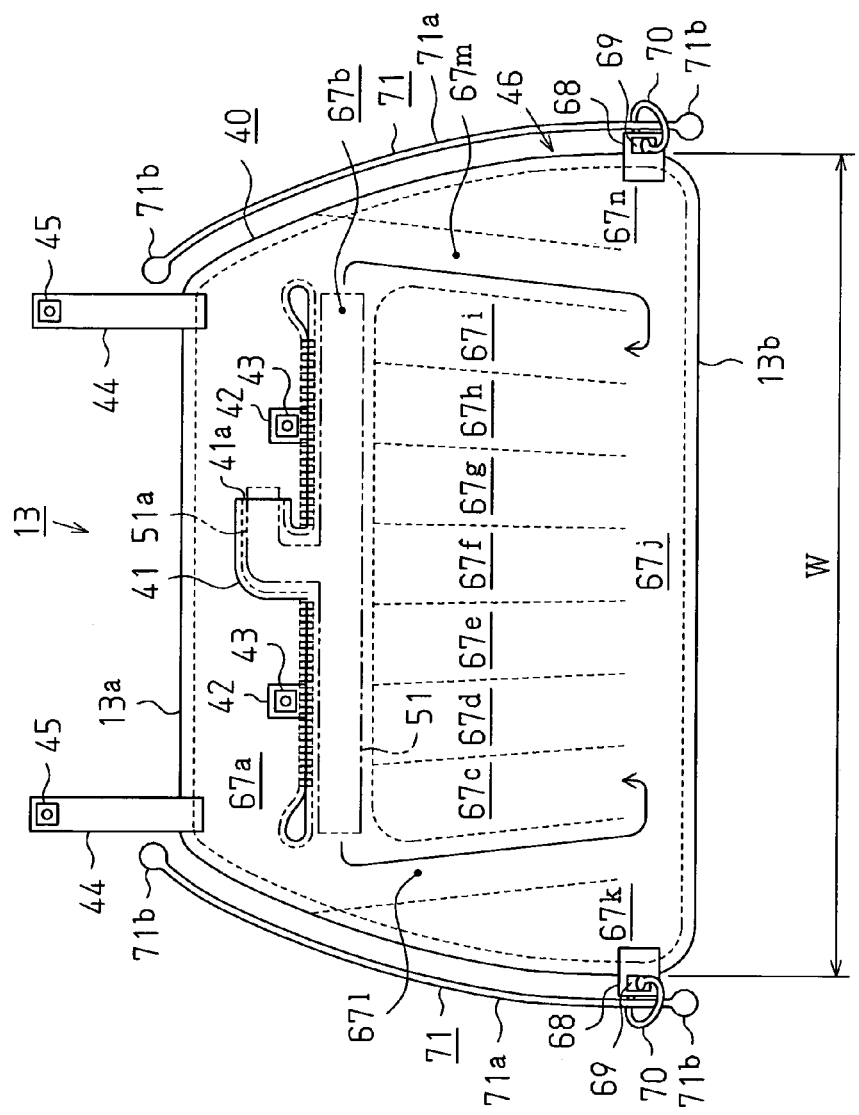

AIRBAG FOR REAR-END COLLISION AND AIRBAG APPARATUS FOR REAR-END COLLISION

BACKGROUND OF THE INVENTION

The present invention relates to an airbag for a rear-end collision and an airbag apparatus for a rear-end collision for absorbing an impact, for example, from a rear part of a vehicle.

In an airbag apparatus for a rear-end collision disclosed in Japanese Laid-Open Patent Publication No. 2002-362284, a folded airbag is contained in the rear end section of a vehicle between a roof panel and a roof headlining of the vehicle. At the time of the actuation of the airbag apparatus, the airbag is inflated and deployed in the back of the backmost section seat of the vehicle by gas supplied from an inflator.

In the apparatus described in the above-mentioned publication, the gas from the inflator is introduced into the airbag from one place of a center section of the airbag in the lateral direction of the vehicle. In addition, the roof headlining is typically installed in the vehicle with its peripheral section caught by a roof section of the vehicle.

For this reason, the center section of the roof headlining in the lateral direction of the vehicle tends to flex by the greatest amount. Therefore, at the time of the actuation of the airbag apparatus, the airbag can start inflation and deployment from the center section in the lateral direction of the vehicle in an accommodated location. That is, it is difficult to control a deployment form of the airbag properly such that the airbag expands uniformly over in the entire lateral direction of the vehicle from the accommodated location.

SUMMARY OF THE INVENTION

Accordingly, it is an objective of the present invention to provide an airbag for rear-end collision that is deployed properly. Another objective of the present invention is to provide an airbag apparatus for rear-end collision that improves protection performance for occupants of a vehicle.

To achieve the foregoing and other objectives and in accordance with the purpose of the present invention, an airbag for rear-end collision of a vehicle is provided. The airbag is accommodated in the interior of the vehicle while being folded in a state extending along a lateral direction of the vehicle. When supplied with gas, the airbag is inflated and deployed in a part of the passenger compartment rearward of the rearmost seat. The airbag includes a supply port and a distribution section. The supply port permits gas to be supplied to the interior of the airbag. The distribution section is connected to the supply port, and distributes gas that has passed through the supply port to different parts in the airbag.

The present invention also provides an airbag apparatus for rear-end collision having an inflator that generates gas, and an airbag for rear-end collision of a vehicle. The airbag is accommodated in the interior of the vehicle while being folded in a state extending along a lateral direction of the vehicle. When supplied with gas, the airbag is inflated and deployed in a part of the passenger compartment rearward of the rearmost seat. The airbag includes a supply port, a distribution section, and a control section. The supply port permits gas from the inflator to be supplied to the interior of the airbag. The distribution section is connected to the supply port, and distributes gas that has passed through the supply port to different parts in the airbag. The control section adjusts flow of gas supplied from the inflator, thereby controlling the deployment of the airbag.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 11 is a front view of an airbag according to a fourth embodiment of the present invention.

DETAILED DESCRIPTION OF THE PREFERRED EMBODIMENTS

Hereinafter, the present invention will be explained with reference to FIGS. 1 to 7 for a first embodiment embodied in an airbag apparatus 11 for a rear-end collision mounted in a minivan or a hatchback.

Figure 1:
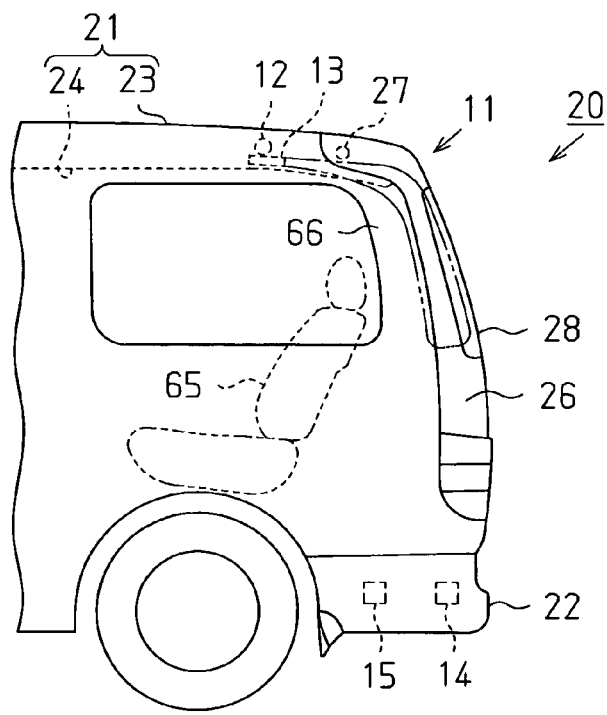
FIG. 1 is a side view of a rear part of a vehicle to which an airbag apparatus for a rear-end collision according to a first embodiment of the present invention is applied.
Figure 2:
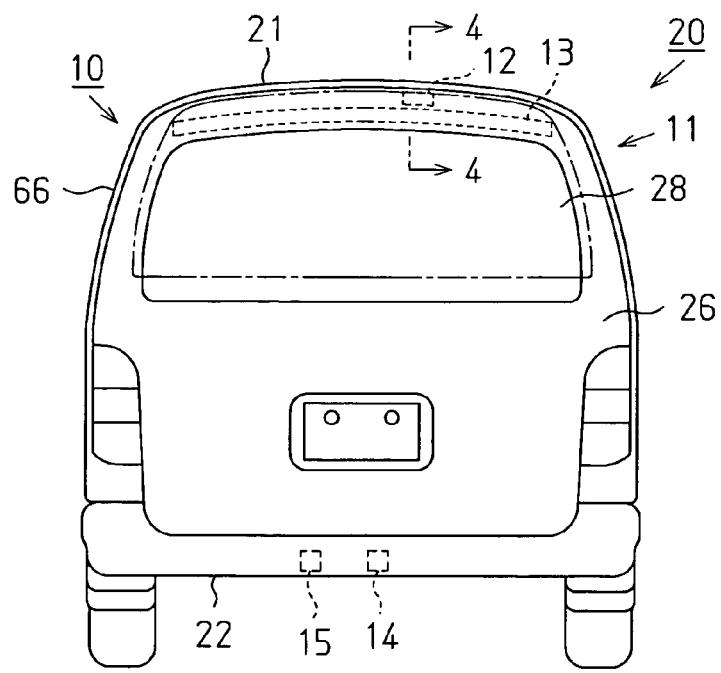
FIG. 2 is a rear view illustrating the vehicle shown in FIG. 1.

As shown in FIGS. 1 and 2, this airbag apparatus 11 for a rear-end collision includes an inflator 12 which generates gas, an airbag 13 for a rear-end collision which is constituted by foundation cloth formed in a shape of a bag, and a sensor 14 which outputs a signal when an impact with the amplitude not less than a predetermined value is applied to a vehicle 20 from the back.

The above-mentioned inflator 12 is provided in a rear section of a roof 21 of the vehicle 20. The above-mentioned airbag 13 is provided near the end section of the roof 21 in the rear side of the vehicle in the state of being folded in a predetermined form. In addition, these inflators 12 and an airbag 13 are connected, for example by a gas supply pipe made from aluminum (not shown) etc. The above-mentioned sensor 14 is attached to the rear part (for example, rear bumper 22 etc.) of the vehicle 20.

In addition, the airbag apparatus 11 for a rear-end collision includes a controller 15. The controller 15 has, for example, a microcomputer. The inflator 12 and the sensor 14 are electrically connected to the controller 15. Then, the controller 15 outputs an active signal to the inflator 12 by inputting a signal from the sensor 14.

Next, the above-mentioned airbag 13 will be explained in further detail.

Figure 3:
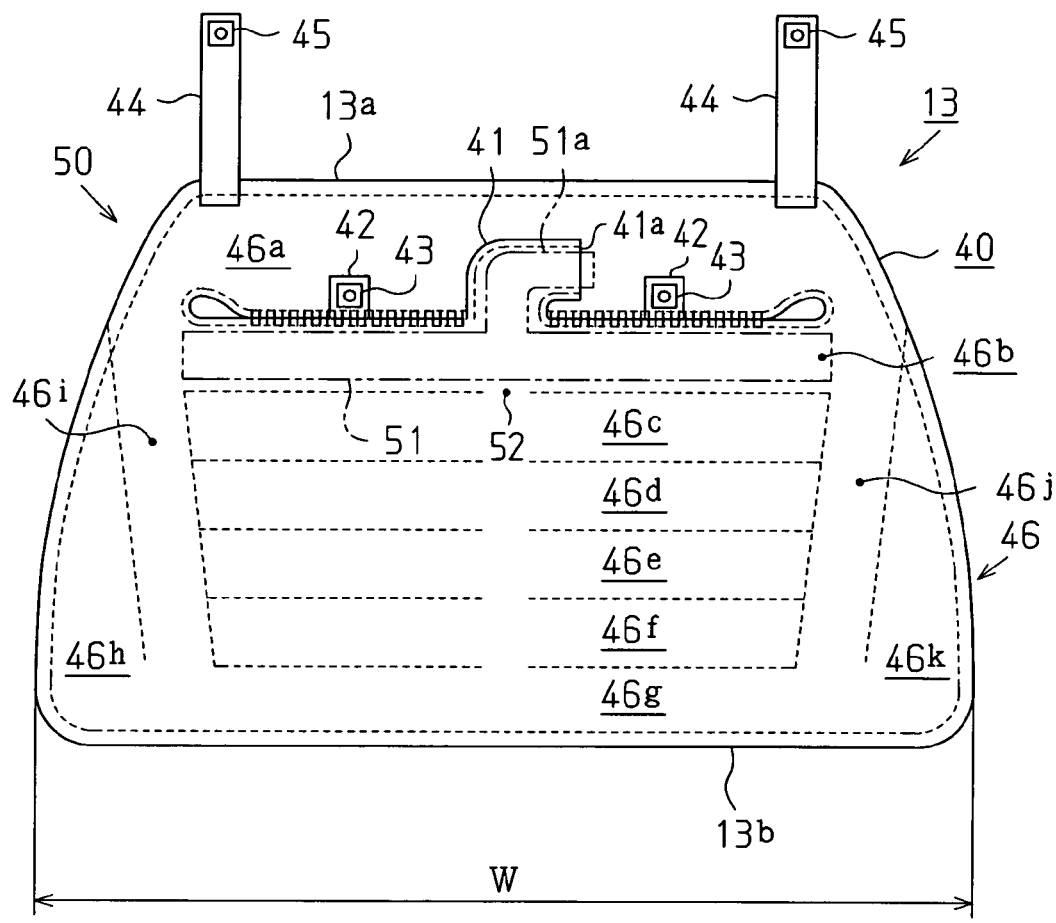
FIG. 3 is a front view showing the airbag of FIG. 1.

As shown in FIG. 3, the airbag 13, for example, is constituted by fabric sheet 40 formed by a hollow weave weaving cloth in the shape of a bag, and is formed so that the fabric sheet 40 forms an approximately quadrangle when the fabric sheet 40 is opened in a plane. In detail, the airbag 13 is formed so that the width W in the lateral direction of the vehicle becomes larger as it goes to a lower edge section 13*b* from an upper edge section 13*a* located in an upper side of the vehicle when inflation and deployment are performed.

In addition, the airbag 13 has a connecting portion 41 connected to the above-mentioned inflator 12 through the above-mentioned gas supply pipe, and a supply port 41*a* is formed in the connecting portion 41.

Furthermore, a pair of mounting pieces 42 for mounting the airbag 13 in the roof 21 of the vehicle 20 is formed near the connecting portion 41 in the airbag 13. These mounting pieces 42 are integrally formed in the fabric sheet 40. Then, while a metal fitting 43 for fixing is attached to each of these mounting pieces 42, through holes which penetrate the metal fitting 43 and mounting piece 42 are formed. In addition, a pair of mounting belts 44 for mounting the airbag 13 in the roof 21 of the vehicle 20 is formed in an upper edge section 13*a* of the airbag 13. These mounting belts 44 are sewn on the fabric sheet 40. Then, while a metal fitting 45 for fixing is attached to each of these mounting belts 44, through holes which penetrate that metal fitting 45 and mounting belt 44 are formed.

A control section 46 which controls the deployment of the airbag 13 by controlling a flow of the gas supplied from the above-mentioned inflator 12 is provided in the airbag 13.

In this embodiment, as shown in FIG. 3, the control section 46 includes a plurality of cells 46*a* to 46*k* (in this example, 11 pieces), which are formed by dividing the interior of the airbag 13. The cells 46*a* to 46*k* expand cylindrical at the time of the supply of the above-mentioned gas while being formed by the sewing of the fabric sheet 40. Among these cells 46*a* to 46*k*, the first cell 46*a* to seventh cell 46*g* are formed so that they extend in the lateral direction of the vehicle in the center section of the airbag 13 in the lateral direction of the vehicle. In addition, the remaining eighth cell 46*h* to eleventh cell 46*k* are formed so that they extend in the vertical direction of the vehicle in both end sections of the airbag 13 in the lateral direction of the vehicle. Although these respective cells 46*a* to 46*k* are partitioned by the sewing of the fabric sheet 40, they are in the state that they communicate with one another, by not sewing the fabric sheet 40 partially.

In detail, the first cell 46*a* and the second cell 46*b* communicate with the ninth cell 46*i* and tenth cell 46*j* in both end sections of those. In addition, the second cell 46*b* to the seventh cell 46*g* communicate mutually in the center of the airbag 13 in the lateral direction of the vehicle. Furthermore, the seventh cell 46*g* communicates with the eighth cell 46*h* to the eleventh cell 46*k* in both end sections. Moreover, the eighth cell 46*h* and ninth cell 46*i* communicate in an end section in a lower section of the vehicle, and the tenth cell 46*j* communicates with the eleventh cell 46*k* also in an end section in the lower section of the vehicle. In addition, the above-mentioned connecting portion 41 is provided so that it communicates with the second cell 46*b* in the center of the vehicle in the lateral direction.

In addition, in this embodiment, as shown in FIG. 3, a distribution section 50 which distributes gas passing through the above-mentioned supply port 41*a* to a plurality of sections in the airbag 13 is provided in the airbag 13.

The distribution section 50 includes a distribution tube 51 which is made of cloth and is incorporated in the airbag 13. The distribution tube 51 is formed so that both of its end sections in the longitudinal direction become approximately cylindrical openings, while being formed with fiber the same as the fiber constituting the fabric sheet 40. Then, the distribution tube 51 is contained so that it extends in the lateral direction of the vehicle in the above-mentioned second cell 46*b* of the airbag 13. In addition, a supply tube section 51*a* which is contained in the above-mentioned connecting portion 41 and leads the gas from the inflator 12 to the inside of the distribution tube 51 is connected to the distribution tube 51. The distribution tube 51 distributes the gas from the inflator 12 so that it circulates to both end sections in the lateral direction of the vehicle within the above-mentioned second cell 46*b*. That is, the distribution tube 51 includes a cylindrical gas passage extending in the lateral direction of the vehicle, and gas releasing ports each provided at an end of the gas passage.

In addition, the distribution tube 51 is constituted so that some of the gas from the inflator 12 causes a leakage in the second cell 46*b* from the inside of the distribution tube 51 through gaps between the fibers between both end sections of the distribution tube 51. That is, the distribution tube 51 leads the gas from the inflator 12 also to the center section in the lateral direction of the vehicle. Then, a part of the leaked gas circulates the inside of the third cell 46*c* to seventh cell 46*g* through a communicating section 52 between the second cell 46*b* and third cell 46*c*. In addition, each effective passage sectional area in both end sections of the distribution tube 51 are formed so as to become larger than an effective passage sectional area of the communicating section 52. For this reason, an amount (volume of distribution) of the gas which passes through respective end sections of the distribution tube 51 is more than an amount of the gas which passes through the communicating section 52.

Next, the structure of an end section of the roof 21 in the rear side of the vehicle in which the above-mentioned airbag 13 is mounted will be explained below.

Figure 4:
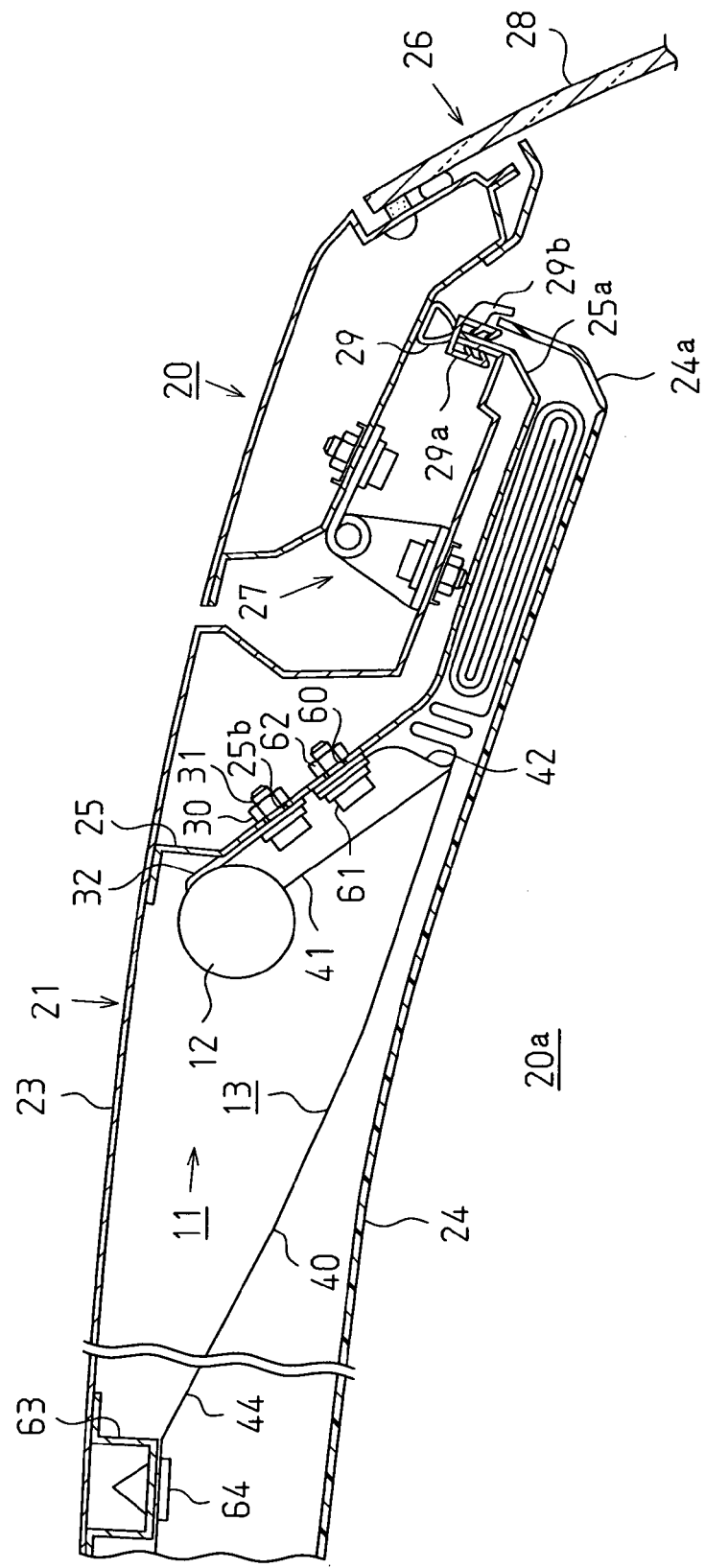
FIG. 4 is an enlarged cross-sectional view taken along line 4—4 of FIG. 2.

As shown in FIG. 4, the roof 21 of the above-mentioned vehicle 20 includes a roof panel 23 which is an exterior member, a roof headlining 24 which is an ornametal member, and an inner panel 25. The roof headlining 24 is provided so as to cover the entire surface of the above-mentioned roof panel 23 in the side of a passenger compartment 20*a* with a material, which has flexibility, such as synthetic resin etc. The inner panel 25 is provided between the above-mentioned roof panel 23 and roof headlining 24, and forms a hollow rear roof rail 25*a* with the roof panel 23. In addition, a back door 26 is mounted in the rear end section of the above-mentioned roof panel 23 through a hinge mechanism 27. A rear window glass 28 is mounted in the back door 26.

An end section 24*a* of the above-mentioned roof headlining 24 in the rear side of the vehicle engages with a cover piece 29*b* which projects from a base 29*a* of a weather strip 29 for seal attached in a rear end section of the inner panel 25. The roof headlining 24 is provided so that its vehicle rear section is displaced below by the pressure at the time of inflation of the airbag 13.

In addition, in a front end section of the inner panel 25 in the rear side of the vehicle 20, while a plurality of mounting holes 25*b* is formed, mounting nuts 30 are welded so as to correspond to these mounting holes 25*b*. These mounting nuts 30 are used for the fixing of the above-mentioned inflator 12. The stiffness of the rear roof rail 25a is made high so that deformation at the time of an impact being applied to the vehicle 20 from the back becomes comparatively small. Then, in this embodiment, the inflator 12 is fixed to the roof 21 (inner panel 25) like this through the above-mentioned mounting nuts 30.

In addition, a bracket 32 is attached to the inner panel 25 by using an anchor bolt 31 screwed into the mounting nut 30 from the mounting hole 25b. The above-mentioned inflator 12 is fixed to the bracket 32.

Next, the fixing structure of the airbag 13 will be explained below.

As shown in FIG. 4, an insertion hole 60 is formed in a position, which corresponds to the mounting piece 42 of an airbag 13, in the front end section of the inner panel 25. In addition, a fixing bolt 61 inserted in the insertion hole 60 toward the inside of the rear roof rail 25a from the side of the passenger compartment 20a is welded. In the state that the fixing bolt 61 is inserted into the through hole of the above-mentioned mounting piece 42 of the airbag 13, a fixing nut 62 is screwed into the fixing bolt 61. Thereby, the above-mentioned airbag 13 is fixed to the inner panel 25 through the mounting piece 42.

In addition, a roof bow 63 arranged so as to extend in the lateral direction of the vehicle in the vehicle front side rather than the inner panel 25 in the side face in the side of the passenger compartment 20a is provided in the roof-panel 23. A mounting hole is formed in a position, which corresponds to the mounting belt 44 of the airbag 13, in the roof bow 63. The airbag 13 is fixed to the roof bow 63 by inserting a clip 64, passing through the through hole of the mounting belt 44, into the mounting hole.

Thus, in the state that the airbag 13 is fixed to the inner panel 25 and roof bow 63, a portion in the side of the upper edge section 13a upper than the mounting piece 42 in the airbag 13, i.e., a portion corresponding to the first cell 46a is contained between the roof panel 23 and roof headlining 24 in the state that it is spread approximately flatly. In addition, a portion in the side of the lower edge section 13b lower than the mounting piece 42 in the airbag 13 is contained between the roof panel 23 and roof headlining 24 in the state of being folded in a predetermined shape so that the inflation direction at the time of inflation of the airbag 13 becomes a direction of going to the above-mentioned back door 26. Thereby, the airbag 13 is contained so that it extends in the lateral direction of the vehicle between the roof panel 23 and roof headlining 24.

Next, the operation of the airbag apparatus 11 for a rear-end collision will be explained below.

First, when an impact larger than a predetermined value is applied to the vehicle 20 from the back, a signal from the above-mentioned sensor 14 is inputted into the controller 15, and a controller 15 outputs an active signal to the inflator 12. Thereby, gas is generated within the inflator 12 and the gas is introduced into the distribution tube 51 through the above-mentioned gas supply pipe. At that time, the gas introduced into the distribution tube 51 is distributed in the direction of both end sections of the distribution tube 51.

Thereby, by the gas supply from the inflator 12, first, in the both end sections of the second cell 46b, the airbag 13 is inflated as the pressure is increased quickly, and the engagement with the roof panel 23 in the vehicle rear section of the roof headlining 24 is released.

Figure 5:
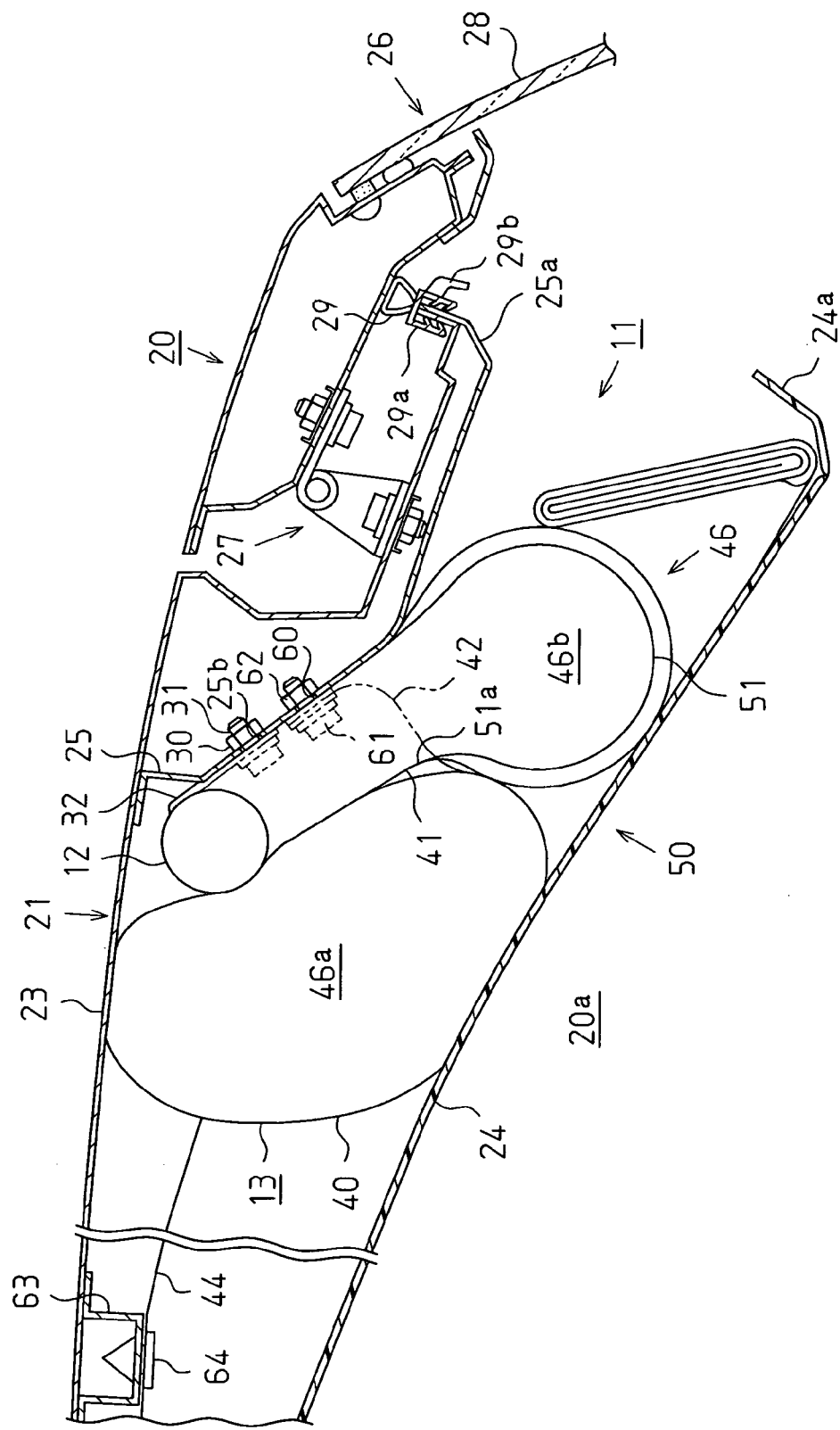
FIG. 5 is an enlarged cross-sectional view of the rear part of the vehicle showing the airbag of FIG. 4 at an initial stage of inflation and deployment.

Next, as shown in FIG. 5, the first cell 46a and the second cell 46b of the airbag 13 expand quickly, and the vehicle rear section of the roof headlining 24 is pressed below. Owing to this pressure, on the whole, the vehicle rear section of the roof headlining 24 is displaced below, and an opening is formed between the roof headlining 24 and inner panel 25.

Figure 6:
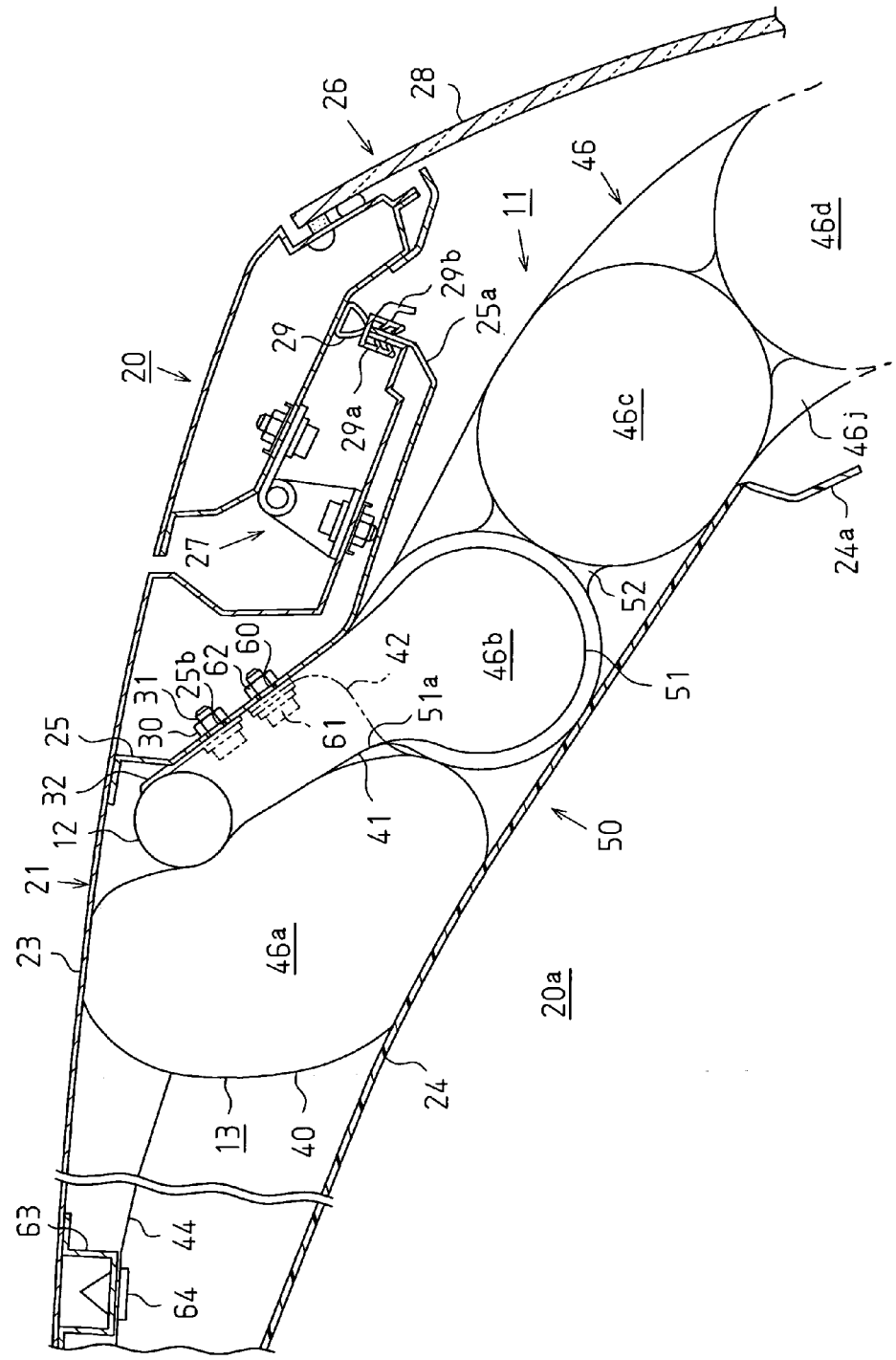
FIG. 6 is an enlarged cross-sectional view of the rear part of the vehicle showing the airbag of FIG. 4 at a final stage of inflation and deployment.
Figure 7:
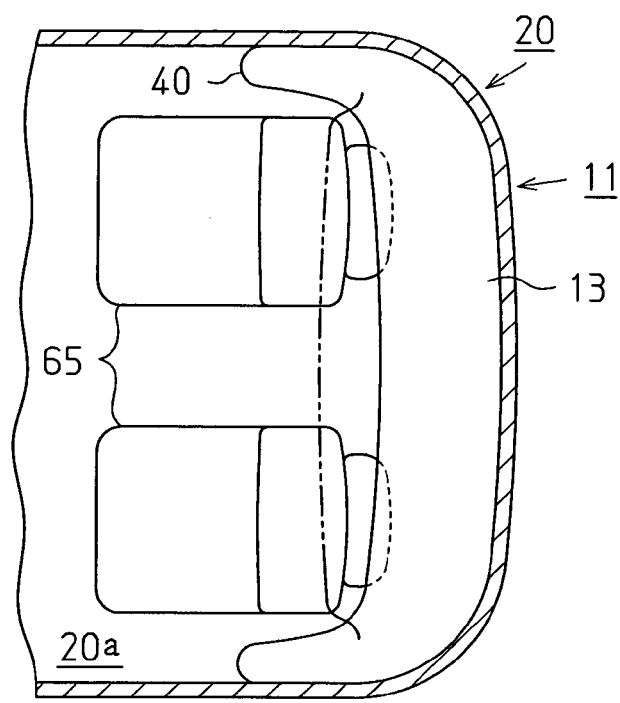
FIG. 7 is a cross-sectional plan view of the rear part of the vehicle showing the airbag of FIG. 4 at the final stage of inflation and deployment.

Then, when the gas is supplied to the inside of the airbag 13 from the inflator 12, as shown in FIG. 6, a portion of the airbag 13 in the side of the lower edge section 13b lower than the mounting piece 42 performs inflation and deployment along with the rear window glass 28. At this time, as shown by a chain double-dashed line in FIG. 1, the airbag 13 is inflated like dropping in the approximately gravity direction from the end section 24a of the roof headlining 24 in the rear side of the vehicle. Owing to this, as shown in FIG. 7, the airbag 13 is deployed so as to divide the backseat 65 and rear window glass 28 which are located in the most vehicle rear side in the passenger compartment 20a. Then, an occupant, who sits down on the backseat 65, and the rear window glass 28 are isolated through the airbag 13. Therefore, by the airbag 13 which is inflated and deployed, not only the impact applied to the back of the vehicle 20 is absorbed, but also the influences to the inside of the passenger compartment 20a caused by a scattering matter from the back, an intruding object, etc. are decreased.

In addition, a portion in the side of the upper edge section 13a upper than the mounting piece 42 in the airbag 13, i.e., the first cell 46a is inflated between the roof panel 23 and roof headlining 24. Thereby, a thick cushion is formed by the first cell 46a also between the roof panel 23 and roof headlining 24. For this reason, the protection capability for an occupant who sits down on the backseat 65 is improved.

Therefore, according to this embodiment, the following advantages are obtained.

(1) In this embodiment, the airbag 13 is contained between the roof panel 23 and roof headlining 24 of the vehicle 20. In addition, the distribution section 50 which distributes gas, which is supplied from the inflator 12 and passes through the supply port 41a, so as to be led to both end sections in the lateral direction of the vehicle in the airbag 13 is provided in the airbag 13.

Generally, a peripheral section of the roof headlining 24 is caught together with the roof panel 23 etc., and in particular, it is firmly attached in both ends in the lateral direction of the vehicle in many cases. Thereby, in locations corresponding to the airbag 13 contained in the folded state, the roof headlining 24 tends to be displaced below to the roof panel 23 in the center section in the lateral direction of the vehicle, and, on the contrary, it tend to be hardly displaced below to the roof panel 23 in both end sections in the lateral direction of the vehicle. Therefore, in an initial stage of inflation and deployment, the airbag 13 tends to expand locally in the center section in the lateral direction of the vehicle and tends to hardly expand in both end sections in the lateral direction of the vehicle.

On the other hand, in this embodiment, the gas supplied into the airbag 13 through the supply port 41a is distributed to both end sections of the airbag 13 in the lateral direction of the vehicle by passing through the distribution section 50. Then, in the initial stage of inflation and deployment of the airbag 13, both end sections of the first cell 46a and the second cell 46b of the airbag 13 are expanded in the lateral direction of the vehicle almost simultaneously. This makes the engagement with the roof panel 23 and roof headlining 24 in the vehicle rear section more rear than the airbag 13 easily released in a large region in the lateral direction of the vehicle. For this reason, in the initial stage of inflation and deployment of the airbag 13, an opening is formed in the rear edge of the roof panel 23 and roof headlining 24 by the inflation of the airbag 13, broadly from both end sections in the lateral direction of the vehicle without largely opening the opening only in the center section in the lateral direction of the vehicle. As a result, the airbag 13 is deployed uniformly over in the entire lateral direction of the vehicle. Then, the protection capability for an occupant who sits down on the backseat 65 is improved.

(2) In this embodiment, it is made to distribute the gas, supplied into the airbag 13 through the supply port 41a, also to the center section of the airbag 13 in the lateral direction of the vehicle by the distribution section 50. In addition, the distribution section 50 is provided so that the volume of distribution of the gas to both end sections of the airbag 13 in the lateral direction of the vehicle becomes more than the volume of distribution of the gas to the center section in the lateral direction of the vehicle.

Thereby, in the initial stage of inflation and deployment of the airbag 13, the gas passing through the supply port 41a is preferentially distributed so as to be circulated in both end sections of the airbag 13 in the lateral direction of the vehicle. For this reason, the gas supplied into the airbag 13 is distributed so as to be filled over in the almost entire airbag 13 in the lateral direction of the vehicle while more broadly opening the opening, formed in the rear edge of the roof panel 23 and roof headlining 24 by the inflation of the airbag 13, from both end sections in the lateral direction of the vehicle. For this reason, the airbag 13 is deployed more uniformly over in the entire lateral direction of the vehicle.

(3) In this embodiment, the distribution section 50 is constituted from the distribution tube 51 incorporated in the airbag 13. Thereby, the gas, passing through the connecting portion 41, is readily distributed to both end sections and the center section in the airbag 13 in the lateral direction of the vehicle.

(4) In this embodiment, the distribution tube 51 is made of cloth formed of textiles made of a material the same as that of the textiles constituting the fabric sheet 40 of the airbag 13, and the same material. Owing to this, the airbag 13 is contained between the roof panel 23 and roof headlining 24 in the state of folding the airbag 13 in a predetermined shape while flattening the distribution tube 51 with the fabric sheet 40 of the airbag 13 at the time of mounting the airbag apparatus 11 for a rear-end collision in the vehicle 20. For this reason, the containability of the airbag 13 between the roof panel 23 and roof headlining 24 is improved. In addition, the weight increase of the airbag 13 is controlled. Furthermore, since the distribution tube 51 and fabric sheet 40 of an airbag 13 are made of the same material, the recycling efficiency of the airbag 13 is raised.

In addition, the above-mentioned first embodiment may be modified as follows.

The distribution tube 51 may have the structure of being formed of cloth whose gas leakage volume from gaps between textiles is extremely small. In addition, the distribution tube 51 may be formed by connecting a plurality of partial distribution tubes where the size of gaps between textiles differs from each other.

A gas releasing port may be provided, which is directed downward (toward the lower edge section 13b) in the state of being incorporated in the airbag 13, in the center section in the longitudinal direction of the distribution tube 51. In addition, this gas releasing port is formed so that its opening area becomes smaller than an opening area in both end sections of the distribution tube 51.

Figure 8:
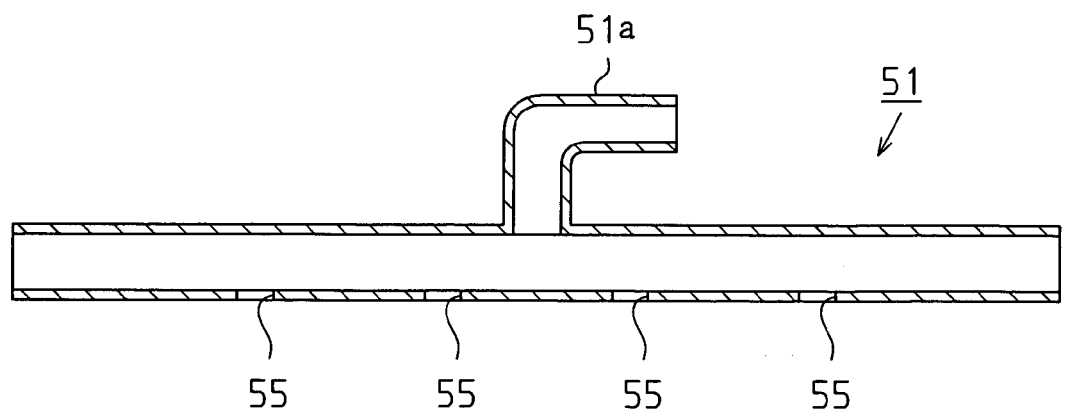
FIG. 8 is a sectional view of a distribution tube according to a modification of the first embodiment.

In this case, as shown in FIG. 8, gas releasing ports 55 may be formed at different locations (four in this example) in the longitudinal direction of the distribution tube 51.

In the above-mentioned embodiment, the material of the textiles constituting the distribution tube 51 is not limited to the same as the material of the textiles constituting the fabric sheet 40, but is arbitrary. However, in this case, the distribution tube 51 is formed by using the textiles consisting of the material which can bear high temperature and high pressure of gas from the inflator 12.

The distribution tube 51 may be also made of metal. When doing in this way, it is possible to easily bear high temperature and high pressure of the gas supplied into the airbag 13, and to easily secure the distributivity of the gas within the airbag 13. In addition, if forming the distribution tube 51 by using a soft material such as an aluminum alloy, it is possible to easily perform the plastic deformation of the distribution tube 51, and hence, it is possible to control the occurrence of an unexpected load, even if heads of an occupant sitting down on the backseat 65 collide with the distribution tube 51. In this case, in order to make it possible to distribute gas to a plurality of locations of the airbag 13 in the lateral direction of the vehicle, one or more gas releasing ports may be provided in a side wall of the distribution tube 51.

Next, with reference to FIG. 9, a second embodiment of the present invention will be explained with focusing on different portions from the above-mentioned first embodiment. In this second embodiment, the structure of the airbag 13 and distribution section 50 differs from that of the above-mentioned first embodiment.

Figure 9:
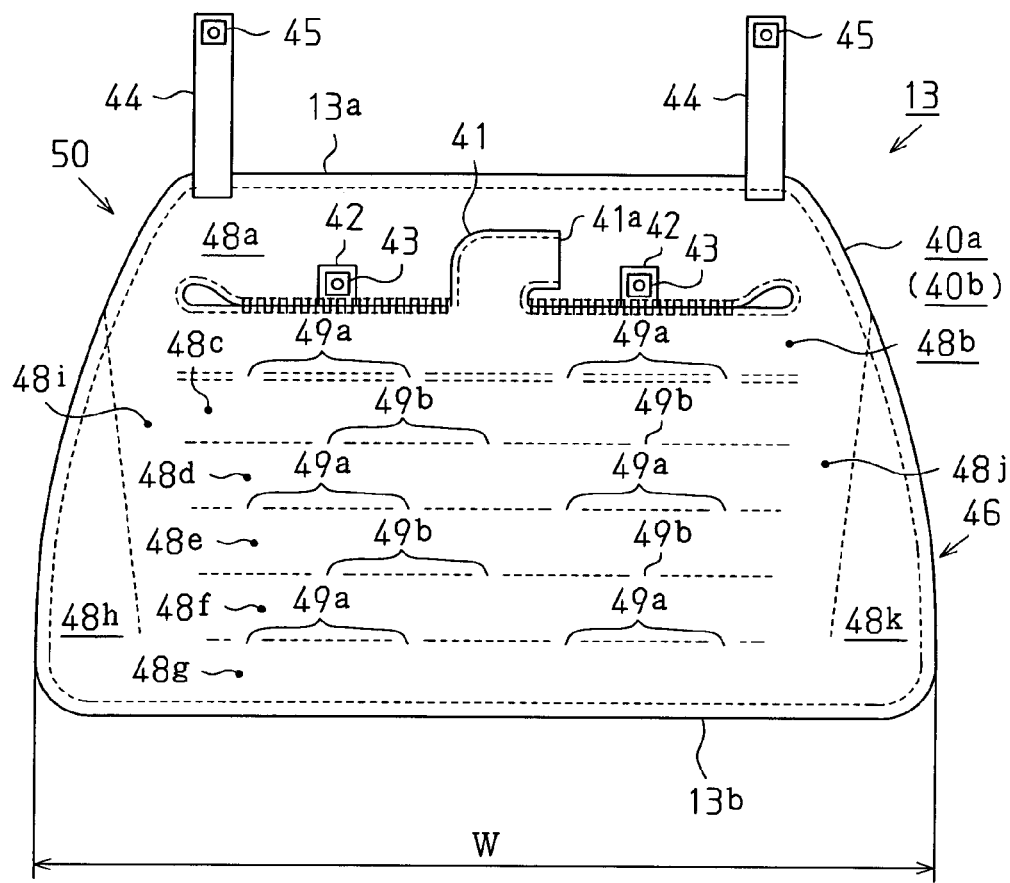
FIG. 9 is a front view of an airbag according to a second embodiment of the present invention.

As shown in FIG. 9, the airbag 13 includes a pair of sheet-shaped fabric sheets 40a and 40b formed so that the airbag 13 becomes an approximately quadrangle when being broadened planarly. These fabric sheets 40a and 40b are formed so that the width W in the lateral direction of the vehicle becomes large, as it goes to the lower edge section 13b from the upper edge section 13a. Then, the airbag 13 is formed in the shape of a bag by sewing the outer peripheries of these fabric sheets 40a and 40b in the state that the pair of fabric sheets 40a and 40b is superposed.

In addition, the plurality of cells 48a to 48k (11 pieces in this example) constituting the above-mentioned control section 46 is provided in the airbag 13 by sewing the fabric sheets 40a and 40b. Among these cells 48a to 48k, the first cell 48a to seventh cell 48g are formed so that they extend in the lateral direction of the vehicle in the center section of the airbag 13 in the lateral direction of the vehicle. In addition, the remaining eighth cell 48h to the eleventh cell 48k are formed so that they extend in the vertical direction of the vehicle in both end sections of the airbag 13 in the lateral direction of the vehicle.

These cells 48a to 48k are in the state that they communicate with one another by not sewing the fabric sheet 40 partially. In detail, the first cell 48a to seventh cell 48g communicate with the ninth cell 48i and tenth cell 48j in both end sections of those. In addition, the eighth cell 48h and ninth cell 48i communicate in an end section in a lower section of the vehicle, and the tenth cell 48j and eleventh cell 48k communicate also in an end section in the lower side of the vehicle. In addition, the above-mentioned connecting portion 41 is provided so that it communicates with the second cell 48b in the center of the vehicle in the lateral direction.

Communicating holes 49a and 49b which connect cells which adjoin in the vertical direction are formed in the second cell 48b to the seventh cell 48g. In this embodiment, four communicating holes 49a are formed between the second cell 48b and third cell 48c, between the fourth cell 48d and fifth cell 48e, and between the sixth cell 48f and seventh cell 48g. In addition, three communicating holes 49*b* are formed between the third cell 48*c* and fourth cell 48*d*, and between the fifth cell 48*e* and sixth cell 48*f*.

Four communicating holes 49*a* formed between the second cell 48*b* and third cell 48*c* are formed so that those opening areas become smaller than the opening area in both end sections of the second cell 48*b*. In addition, the communicating hole 49*a* and communicating hole 49*b* are formed so that they are arranged alternately in the lateral direction of the vehicle.

In addition, in this embodiment, the second cell 48*b* of the airbag 13 plays a role of the distribution section 50. In this embodiment, the double stitched seam of both the fabric sheets 40*a* and 40*b* between the second cell 48*b* and third cell 48*c* is performed. Thereby, it is possible to improve the sewing strength of both the fabric sheets 40*a* and 40*b* between the second cell 48*b* and third cell 48*c*, and hence, the sewing of both the fabric sheets 40*a* and 40*b* between the second cell 48*b* and third cell 48*c* is not released by the pressure at the time of inflation and deployment of the airbag 13.

Therefore, according to this embodiment, in addition to the advantages mentioned in items (1) and (2) in the above-mentioned first embodiment, the following advantages are obtained.

(5) In this embodiment, the second cell 48*b* of the airbag 13 plays a role of the distribution section 50. Thereby, it becomes unnecessary to constitute the distribution section 50 by a member different from that in the fabric sheets 40*a* and 40*b*. For this reason, it is possible to decrease the number of components constituting the airbag 13, and the manufacturing cost of the airbag 13.

(6) In this embodiment, communicating holes 49*a* and 49*b*, communicating cells adjoining in the vertical direction among the second cell 48*b* to seventh cell 48*g*, are provided in the airbag 13. Thereby, it is possible to quickly supply a part of gas, which flows into the second cell 48*b* via the connecting portion 41, to the third cell 48*c* to the seventh cell 48*g*. Hence, it is possible to quickly expand these third cell 48*c* to seventh cell 48*g*. For this reason, it is possible to increase a deployment force to the lower part of the airbag 13.

(7) In this embodiment, the communicating hole 49*a* and communicating hole 49*b* are arranged alternately in the lateral direction of the vehicle. Thereby, for example, the gas flowing out to the third cell 48*c* from the second cell 48*b* through the communicating hole 49*a* flows through the inside of the third cell 48*c* toward both end sections in the lateral direction of the vehicle. Then, a part of the gas in the third cell 48*c* flows into the fourth cell 48*d* through the communicating hole 49*b*. For this reason, it is possible to perform the overall inflation of the respective cells 48*b* to 48*g* early and securely. As a result, it is possible to give the airbag 13 the deployment force to a lower part without reducing the deployment force in the lateral direction of the vehicle.

In addition, in the above-mentioned second embodiment, the number of communicating holes 49*a* and 49*b* is arbitrary, and can be suitably changed according to the size, a shape, etc. of the airbag 13.

Figure 10:
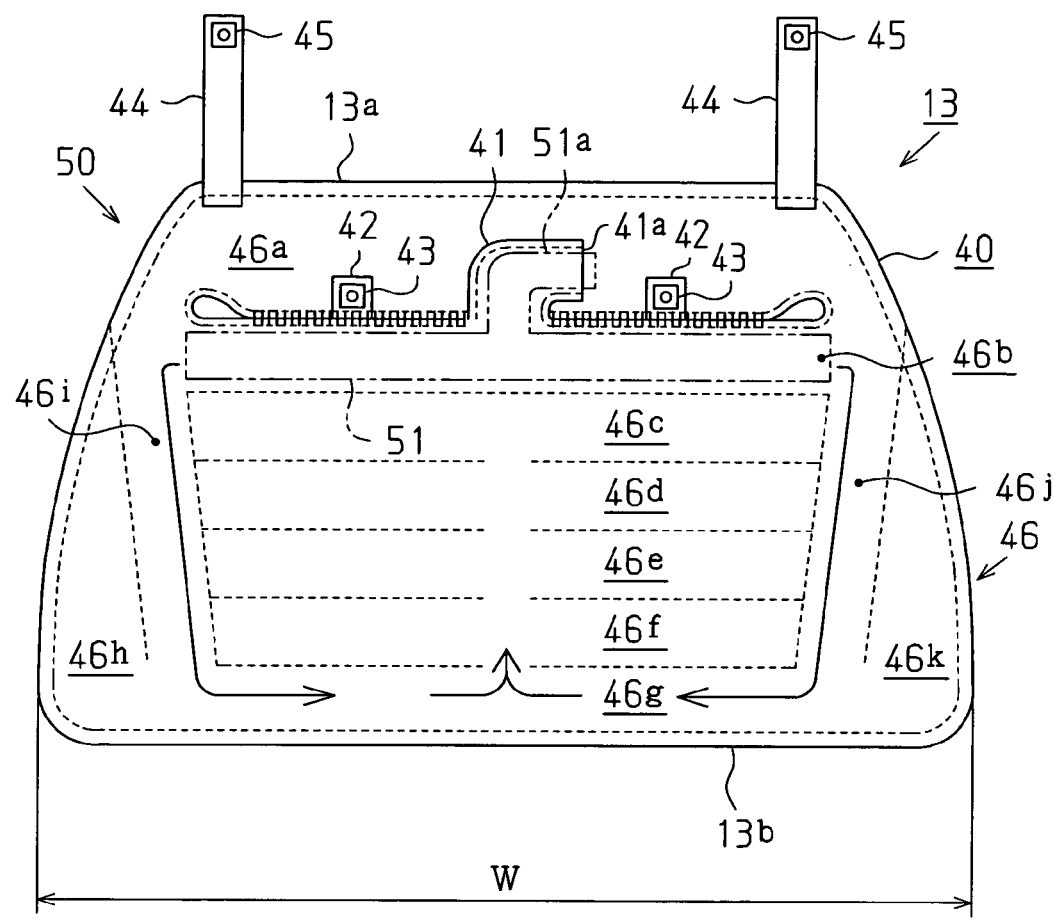
FIG. 10 is a front view of an airbag according to a third embodiment of the present invention.

With reference to FIG. 10, a third embodiment of the present invention will be explained with focusing on different portions from the above-mentioned first embodiment. In this third embodiment, the communicating section 52 in the first embodiment is blocked by sewing the fabric sheet. 40. Then, the gas supplied to the second cell 46*b* flows in the lateral direction of the vehicle without circulating in the third cell 46*c*, and circulates in the ninth cell 46*i* and tenth cell 46*j*. In addition, the distribution tube 51 made of cloth in first embodiment is coated with a resin etc. Then, without the gas leaking out from gaps between the textiles which constitute the distribution tube 51, the gas supplied to the distribution tube 51 is distributed so as to circulate in both end sections in the lateral direction of the vehicle. In addition, in this embodiment, the ninth cell 46*i* and tenth cell 46*j* are constituted as a deployment distribution section. The ninth cell 46*i* and tenth cell 46*j* are provided to form gas passages that are located at sections in the vicinity of the lateral ends of the vehicle and extend substantially along the vehicle vertical direction. The gas passages lead gas to the lower portion of the airbag 13 in the vehicle vertical direction.

In the airbag 13 of the third embodiment, the gas flowing into the distribution tube 51 from the supply tube section 51*a* is distributed to both of the right and left ends of the distribution tube 51, and circulates in the ninth cell 46*i* and tenth cell 46*j*. In addition, the gas supplied to the second cell 46*b* flows in the ninth cell 46*i* and tenth cell 46*j* without circulating in the third cell 46*c*. Then, in an initial stage of inflation of the airbag 13, the ninth cell 46*i* and tenth cell 46*j* are inflated preferentially to the third cell 46*c* to the seventh cell 46*g*. That is, since the ninth cell 46*i* and tenth cell 46*j* are provided so as to extend in the vertical direction of the vehicle, the inflation of the ninth cell 46*i* and tenth cell 46*j* becomes an impelling force at the time of the airbag 13 deployed in the vertical direction of the vehicle. Therefore, the side of the lower edge section 13*b* of the airbag 13, which is lower than the mounting piece 42, is projected from between the roof headlining 24 and inner panels 25 in the initial stage of inflation.

Then, the gas filling the ninth cell 46*i* and tenth cell 46*j* circulates in order of the seventh cell 46*g*, sixth cell 46*f*, fifth cell 46*e*, fourth cell 46*d*, and third cell 46*c*, and the respective cells 46*g* to 46*f* are inflated.

Therefore, according to this embodiment, in addition to the advantages mentioned in items (1) and (4) in the above-mentioned first embodiment, the following advantages are obtained.

(8) In this embodiment, without the gas leaking out from gaps between the textiles which constitute the distribution tube 51, the gas supplied to the distribution tube 51 is distributed so as to circulate in both end sections in the lateral direction of the vehicle. In addition, the gas supplied to the second cell 46*b* flows in the ninth cell 46*i* and tenth cell 46*j* without circulating in the third cell 46*c*. Furthermore, the gas distributed to both end sections in the lateral direction of the vehicle circulates in the ninth cell 46*i* and tenth cell 46*j*, and it is led to the lower portion of the airbag 13 in the vertical direction of the vehicle. According to the structure like this, the side of the lower edge section 13*b* of the airbag 13, which is lower than the mounting piece 42, is projected from between the roof headlining 24 and inner panels 25 in the initial stage of inflation of the airbag 13. That is, the airbag 13 is projected in the state that the inflation of the center section (the third cell 46*c* to seventh cell 46*g*) of the airbag 13 in the lateral direction of the vehicle is controlled. Therefore, the subsequent inflation operation of the airbag 13 cannot be easily obstructed by the roof headlining 24. In addition, since the inflation of the center section of the airbag 13 in the lateral direction of the vehicle is controlled, it is possible to control the projection of the roof headlining 24 downward.

With reference to FIG. 11, a fourth embodiment of the present invention will be explained with focusing on different portions from the above-mentioned first embodiment.

The airbag 13 in the fourth embodiment has a plurality of cells which are different from the third cell 46c to sixth cell 46f in the first embodiment.

As shown in FIG. 11, the airbag 13 of this embodiment is partitioned into fourteen cells of the first cell 67a to fourteenth cell 67n as the above-mentioned control section 46. The first cell 67a is the same as the first cell 46a in the above-mentioned first embodiment. The second cell 67b is provided under the first cell 67a so as to extend in the lateral direction of the vehicle. Both side sections of the second cell 67b in the lateral direction of the vehicle are formed so as to widen as it goes to their end sections.

The third cell 67c to ninth cell 67i are provided under the second cell 67b so as to extend in the vertical direction of the vehicle respectively. The third cell 67c to ninth cell 67i are provided adjacently in order, and a center section of the airbag 13 is partitioned with making the third cell 67c and ninth cell 67i be both of the left and right sides.

The tenth cell 67j is provided in the lower side of the vehicle in the third cell 67c to ninth cell 67i so as to extend in the lateral direction of the vehicle. Then, the lower edge sections of the third cell 67c to ninth cell 67i communicate with the tenth cell 67j.

In the left side of the third cell 67c and the right-hand side of the ninth cell 67i (both side sections of the airbag 13), the twelfth cell 67l and thirteenth cell 67 m as a deployment distribution section are provided so as to extend in the vertical direction of the vehicle respectively. Then, the gas is led to the lower portion of the airbag 13 in the vertical direction of the vehicle by the twelfth cell 67l and thirteenth cell 67m.

Both end sections of the first cell 67a and the second cell 67b communicate with the twelfth cell 67l and thirteenth cell 67m. The lower edge sections of the twelfth cell 67l and thirteenth cell 67m communicate with the tenth cell 67j. In the left side of the twelfth cell 67l and the right-hand side of the thirteenth cell 67m, the eleventh cell 67k and fourteenth cell 67n are provided so as to extend in the vertical direction of the vehicle respectively. Then, the lower edge sections of the eleventh cell 67k and fourteenth cell 67n communicate with the tenth cell 67j.

A pair of guide member mounting pieces 68 is sewn in both of the right and left ends of the lower edge section 13b of the airbag 13. A mounting metal fitting 69 is provided in each of these guide member mounting pieces 68, and a through hole is provided in each of the guide member mounting pieces 68 and mounting metal fittings 69. A pair of circular guide rings 70 which constitute part of a guide mechanism respectively is inserted in the through holes respectively. On the other hand, a pair of guide shafts 71 which constitute part of the guide mechanism is provided in both sides of the airbag 13 in an inflated state so as to extend in the vertical direction of the vehicle. Each of these guide shafts 71 is formed by providing each fixed section 71b in both ends of a metal guide section 71a. The fixed sections 71b are fixed to a rear pillar 66 etc., and the guide sections 71a are provided so as to be along both sides of the airbag 13 in an inflated state. These guide sections 71a are close to the above-mentioned twelfth cell 67l and thirteenth cell 67m.

In addition, each of the guide sections 71a is loosely inserted in each of the guide rings 70, and each of the guide rings 70 can slide in the vertical direction of the vehicle with being guided by each of the guide section 71a. Then, at the time of the deployment of the airbag 13, the deployment direction of the airbag 13 is controlled by the guide rings 70 and guide shafts 71.

In the airbag 13 of the fourth embodiment, the gas flowing into the distribution tube 51 from the supply tube section 51a is distributed to both of the right and left ends of the distribution tube 51, and circulates in the twelfth cell 67l and thirteenth cell 67m. In addition, a part of the gas flowing into the distribution tube 51 passes the second cell 67b and circulates in the twelfth cell 67l and thirteenth cell 67m while being leaked in the second cell 67b. At this time, in an inflation phase of the airbag 13, the twelfth cell 67l and thirteenth cell 67m are inflated preferentially to the third cell 67c to the ninth cell 67i, and the inflation becomes an impelling force at the time of the airbag 13 deployed in the vertical direction of the vehicle.

Then, as the twelfth cell 67l and thirteenth cell 67m are inflated, the airbag 13 is deployed. At this time, while the guide rings 70 are provided in the airbag 13, the guide shafts 71 are provided in both sides of the airbag 13. Then, the guide rings 70 slide with being guided by the guide sections 71a, in connection with the deployment of the airbag 13. Therefore, the inflation direction of the airbag 13 is controlled by the guide rings 70 and guide shafts 71.

Therefore, according to this embodiment, in addition to the advantages mentioned in items (1) and (4) in the above-mentioned first embodiment and the advantage in item (8) of the third embodiment, the following advantages are obtained.

(9) In this embodiment, while the guide rings 70 are provided in the airbag 13, the guide shafts 71 are provided in both sides of the airbag 13. When constituted like this, the inflation direction of the airbag 13 is controlled, and hence, it is possible to further stabilize the deployment of the airbag 13.

(10) In this embodiment, the twelfth cell 67l and thirteenth cell 67m are provided in both side sections of the airbag 13, and the twelfth cell 67l and thirteenth cell 67m are close to the guide shafts 71 respectively. Therefore, since it is possible to make the guide ring 70 securely slide in connection with the deployment of the twelfth cell 67l and thirteenth cell 67m, it is possible to make features of the guide mechanism fully demonstrated.

(11) Tension is added to the airbag 13 when the third cell 67c to ninth cell 67i expand preferentially. Therefore, since the width W of the airbag 13 is narrowed, the guide rings 70 become in the state of being tensioned to the guide sections 71a. In this embodiment, since the airbag 13 is deployed when the twelfth cell 67l and thirteenth cell 67m are inflated preferentially, the inflow of the gas to the third cell 67c to ninth cell 67i is controlled at the time of the deployment of the airbag 13. Therefore, since the tension added to the airbag 13 is controlled, the sliding of the guide rings 70 along the guide sections 71a is performed smoothly.

In addition, as elements common in some embodiments mentioned above which can be modified, the followings are listed.

In the above-mentioned first and second embodiments, the sewing aspects of the fabric sheets 40, 40a, and 40b, i.e., the allocation aspects of the cells 46a to 46k and 48a to 48k are not limited to those shown in FIGS. 3 and 9. The allocation aspect of these cells 46a to 46k can be suitably modified, for example, according to the size, shape, etc. of the airbag 13.

The present invention is not limited to that the distribution tube 51 is provided in the above-mentioned first and second embodiment so as to extend over both end sections of the second cell 46b of the airbag 13. The length of the distribution tube 51 is arbitrary so long as it is possible to distribute the gas from the supply port 41a to both end sections of the airbag 13 in the lateral direction of the vehicle. Specifically, it may be provided a little inner than both ends of the second cell 46b.

In the above-mentioned respective embodiments, part of the airbag 13 may be contained between a vehicle body and the rear pillar 66.

In the above-mentioned respective embodiments, as shown in FIG. 7, the airbag 13 is deployed so as to cover a surface of the rear pillar 66 of the vehicle 20 in the side of the passenger compartment 20a, but the present invention is not limited to this structure. At the time of inflation and deployment, it is also acceptable to be an airbag which does not cover the surface of the rear pillar 66 in the side of the passenger compartment 20a.

In the above-mentioned respective embodiments, the inflator 12 is provided in the end section of the roof 21 in the rear side of the vehicle 20. But, the location, in which the inflator 12 is provided, may be changed so long as it is possible to securely supply the gas from the inflator 12 to the airbag 13.

In the above-mentioned respective embodiments, the airbag apparatus 11 for a rear-end collision is contained between the roof panel 23 and roof headlining 24. On the other hand, the airbag apparatus 11 for a rear-end collision may be also installed on the roof headlining 24 in the state of being contained in, for example, a housing which can be opened at the time of inflation and deployment of the airbag 13.

In the above-mentioned respective embodiment, one inflator 12 and one airbag 13 are provided. But, so long as an impact applied to the vehicle 20 from the back is suitably absorbable, the number of at least one of the inflator 12 and airbag 13 may be two or more.

In the above-mentioned respective embodiments, the airbag 13 may be inflated by an output from a sensor for a collision prognosis in the vehicle 20. In this case, since the inflation and deployment of the airbag 13 is performed before the vehicle 20 collides, it is possible to restrict an occupant more securely.

In the above-mentioned respective embodiments, the airbag 13 is inflated and deployed so as to hang down approximately in the gravity direction. On the other hand, in the vehicle where the rear window glass 28 is installed in the oblique state, the airbag 13 may be inflated and deployed along a tilt of the rear window glass 28.

In the above-mentioned respective embodiments, although the present invention is embodied in a minivan or a hatchback, the present invention may be embodied also in a sedan.

Therefore, the present examples and embodiments are to be considered as illustrative and not restrictive and the invention is not to be limited to the details given herein, but may be modified within the scope and equivalence of the appended claims.

The invention claimed is:

1. An airbag for rear-end collision of a vehicle, the vehicle having a roof panel and a roof headlining that covers the entire surface of the roof panel on a side facing a passenger compartment, wherein the airbag is accommodated in a space above the roof headlining while being folded in a state extending along a lateral direction of the vehicle, and when supplied with gas, the airbag is inflated and deployed to be laterally symmetrical in a part of the passenger compartment rearward of the rearmost seat, the airbag comprising:

a supply port that permits gas to be supplied to the interior of the airbag, the supply port being located in a center of the lateral direction of the airbag; and a laterally symmetrical distribution section connected to the supply port at a center of the distribution section in the lateral direction, the distribution section including a cell connected to the supply port, wherein the cell is deployed and inflated in the space above the roof headlining to displace the roof headlining, thereby creating an opening through which the airbag extends into the passenger compartment, and wherein the distribution section distributes, through the cell, gas that has passed through the supply port to different parts in the airbag including end portions in the lateral direction of the vehicle.

2. The airbag for rear-end collision according to claim 1, wherein the distribution section guides gas to end sections of the airbag in the lateral direction of the vehicle.

3. The airbag for rear-end collision according to claim 2, wherein the distribution section includes a gas passage extending in the lateral direction of the vehicle and gas releasing ports each provided at an end of the gas passage, and wherein gas drawn into the airbag through the supply port is released through the releasing ports.

4. The airbag for rear-end collision according to claim 2, wherein the distribution section also guides gas to a center section of the airbag in the lateral direction of the vehicle, and the distribution section is provided so that the volume of distribution of gas to the end sections of the airbag is more than the volume of distribution of gas to the center section.

5. The airbag for rear-end collision according to claim 1, further comprising a deployment distribution section that leads gas to a lower portion of the airbag in the vehicle vertical direction.

6. The airbag for rear-end collision according to claim 5, wherein the deployment distribution section includes gas passages that are located at sections in the vicinity of the lateral ends of the vehicle and extend substantially along the vehicle vertical direction.

7. The airing for rear-end collision according to claim 1, wherein the distribution section includes a distribution tube incorporated in the cell of the airbag.

8. The airbag for rear-end collision according to claim 7, wherein the distribution tube is made of metal.

9. The airbag for rear-end collision according to claim 7, wherein the distribution tube has a plurality of releasing ports for releasing gas into the airbag, and the releasing ports are arranged in the airbag along the lateral direction of the vehicle.

10. The airbag for rear-end collision according to claim 7, wherein the distribution tube is made of cloth.

11. The airbag for rear-end collision according to claim 1, wherein the cell is defined by sewing fabric sheets forming the airbag.

12. The airbag for rear-end collision according to claim 1, further comprising a control section, wherein the control section adjusts flow of gas inside the airbag, thereby controlling the deployment of the airbag.

13. The airbag for rear-end collision according to claim 12, wherein the control section includes a plurality of cells formed by dividing the interior of the airbag.

14. An airbag apparatus for rear-end collision comprising an inflator that generates gas, and an airbag for rear-end collision of a vehicle, the vehicle having a roof panel and a roof headlining that covers the entire surface of the roof panel on a side facing a passenger compartment, wherein the airbag is accommodated in a space above the roof headlining while being folded in a state extending along a lateral direction of the vehicle, wherein, when supplied with gas, the airbag is inflated and deployed to be laterally symmetrical in a part of the passenger compartment rearward of the rearmost seat, the airbag including:
a supply port that permits gas from the inflator to be supplied to the interior of the airbag, the supply port being located in a center of the lateral direction of the airbag;
a laterally symmetrical distribution section connected to the supply port at a center of the distribution section in the lateral direction, the distribution section including a cell connected to the supply port, wherein the cell is deployed and inflated in the space above the roof headlining to displace the roof headlining, thereby creating an opening through which the airbag extends into the passenger compartment, and wherein the distribution section distributes, through the cell, gas that has passed through the supply port to different parts in the airbag including end portions in the lateral direction of the vehicle;
a control section, wherein the control section adjusts flow of gas supplied from the inflator, thereby controlling the deployment of the airbag.

15. The airbag apparatus for rear-end collision according to claim 14, wherein the distribution section guides gas to ends of the airbag in the lateral direction of the vehicle.

16. The airbag apparatus for rear-end collision according to claim 15, wherein the distribution section includes a gas passage extending in the lateral direction of the vehicle and gas releasing ports each provided at an end of the gas passage, and wherein gas drawn into the airbag through the supply port is released through the releasing ports.

17. The airbag apparatus for rear-end collision according to claim 15, wherein the distribution section also guides gas to a center section of the airbag in the lateral direction of the vehicle, and the distribution section is provided so that the volume of distribution of gas to the end sections of the airbag is more than the volume of distribution of gas to the center section.

18. The airbag apparatus for rear-end collision according to claim 14, wherein the control section includes a deployment distribution section that leads gas to a lower portion of the airbag in the vehicle vertical direction.

19. The airbag apparatus for rear-end collision according to claim 18, wherein the deployment distribution section includes gas passages that are located at sections in the vicinity of the lateral ends of the vehicle and extend substantially along the vehicle vertical direction.

20. The airbag apparatus for rear-end collision according to claim 14, further comprising a guide mechanism that guides the deployment of the airbag.

* * * * *